US009176535B2

(12) United States Patent
Bohn et al.

(10) Patent No.: US 9,176,535 B2
(45) Date of Patent: Nov. 3, 2015

(54) FLEXIBLE DISPLAY FLEXURE ASSEMBLY

(75) Inventors: David D. Bohn, Fort Collins, CO (US); Rod G. Fleck, Bellevue, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 527 days.

(21) Appl. No.: 13/152,828

(22) Filed: Jun. 3, 2011

(65) Prior Publication Data
US 2012/0307423 A1 Dec. 6, 2012

(51) Int. Cl.
*G06F 1/16* (2006.01)
*E05D 15/00* (2006.01)
*E05D 11/06* (2006.01)
*H04M 1/02* (2006.01)

(52) U.S. Cl.
CPC ............ *G06F 1/1641* (2013.01); *G06F 1/1652* (2013.01); *G06F 1/1681* (2013.01); *H04M 1/0216* (2013.01); *H04M 1/0268* (2013.01)

(58) Field of Classification Search
CPC .... G06F 1/1652; G06F 1/1641; G06F 1/1681
USPC ............. 361/679.01–679.45, 679.55–679.59; 345/156, 157, 168, 169, 905; 455/575.1, 575.3, 575.4; 16/368, 369, 16/371
See application file for complete search history.

(56) References Cited

U.S. PATENT DOCUMENTS

| | | | |
|---|---|---|---|
| 5,712,760 A | 1/1998 | Coulon et al. | |
| 6,006,243 A | 12/1999 | Karidis | |
| 6,016,176 A | 1/2000 | Kim et al. | |
| 6,170,120 B1 | 1/2001 | Lu | |
| 6,230,365 B1 | 5/2001 | Lu | |
| 6,421,235 B2 * | 7/2002 | Ditzik | 361/679.3 |
| 6,563,700 B1 | 5/2003 | Waller et al. | |
| 6,577,496 B1 | 6/2003 | Gioscia et al. | |
| 6,751,473 B1 | 6/2004 | Goyal et al. | |
| 6,859,357 B2 | 2/2005 | Morimoto et al. | |
| 7,127,776 B2 | 10/2006 | Park | |
| 7,200,224 B2 | 4/2007 | Park et al. | |

(Continued)

FOREIGN PATENT DOCUMENTS

KR 100867608 11/2008
WO WO-2009131447 10/2009

OTHER PUBLICATIONS

"Non-Final Office Action", U.S. Appl. No. 13/153,092, (Feb. 11, 2013), 17 pages.

(Continued)

*Primary Examiner* — Nidhi Thaker
(74) *Attorney, Agent, or Firm* — Jeremy Snodgrass; Judy Yee; Micky Minhas

(57) ABSTRACT

In embodiments of a flexible display flexure assembly, a flexure assembly includes a structure of pivotable links that couples first and second housing parts of a foldable electronic device. The first housing part of the foldable electronic device includes a flexible display, and the first housing part is integrated with a first section of the flexible display. The second housing part of the foldable electronic device is integrated with a second section of the flexible display. The pivotable links are implemented to collapse relative to each other to form a bend radius of the flexible display and support the flexible display in a closed position of the foldable electronic device. The structure of the pivotable links is also implemented to support the flexible display in an open position of the foldable electronic device.

20 Claims, 8 Drawing Sheets

(56) References Cited

U.S. PATENT DOCUMENTS

| | | | |
|---|---|---|---|
| 7,299,523 | B2 | 11/2007 | Zou |
| 7,336,782 | B2 | 2/2008 | Watanabe et al. |
| 7,345,872 | B2 | 3/2008 | Wang |
| 7,374,424 | B1 | 5/2008 | Nurmi et al. |
| D580,432 | S | 11/2008 | Yun et al. |
| 7,714,801 | B2 | 5/2010 | Kimmel |
| 7,970,442 | B2 | 6/2011 | Chiang |
| 8,228,678 | B2 | 7/2012 | Hasegawa et al. |
| 8,804,324 | B2 | 8/2014 | Bohn et al. |
| 2002/0067339 | A1* | 6/2002 | Min ............................ 345/156 |
| 2002/0104769 | A1 | 8/2002 | Kim et al. |
| 2004/0052044 | A1 | 3/2004 | Mochizuki et al. |
| 2004/0091101 | A1 | 5/2004 | Park et al. |
| 2004/0244146 | A1 | 12/2004 | Park |
| 2005/0208807 | A1 | 9/2005 | Lin |
| 2006/0018102 | A1 | 1/2006 | Soderlund |
| 2006/0050169 | A1 | 3/2006 | Misawa |
| 2006/0146488 | A1* | 7/2006 | Kimmel ....................... 361/681 |
| 2006/0238494 | A1 | 10/2006 | Narayanaswami et al. |
| 2006/0238970 | A1 | 10/2006 | Ukonaho et al. |
| 2007/0004475 | A1 | 1/2007 | Kuo et al. |
| 2007/0097014 | A1 | 5/2007 | Solomon et al. |
| 2007/0127199 | A1 | 6/2007 | Arneson |
| 2008/0018631 | A1 | 1/2008 | Hioki et al. |
| 2008/0167095 | A1 | 7/2008 | Kim et al. |
| 2008/0253073 | A1 | 10/2008 | Kee et al. |
| 2009/0000062 | A1 | 1/2009 | Yamanami |
| 2010/0043174 | A1 | 2/2010 | Bestle et al. |
| 2010/0071155 | A1 | 3/2010 | Ueyama et al. |
| 2010/0075717 | A1 | 3/2010 | Ou |
| 2010/0085274 | A1 | 4/2010 | Kilpatrick, II et al. |
| 2010/0117975 | A1 | 5/2010 | Cho |
| 2010/0164837 | A1 | 7/2010 | Kao et al. |
| 2010/0182288 | A1* | 7/2010 | Misawa ........................ 345/204 |
| 2010/0232094 | A1 | 9/2010 | Chen |
| 2010/0232100 | A1* | 9/2010 | Fukuma et al. .......... 361/679.01 |
| 2010/0238098 | A1 | 9/2010 | Watanabe |
| 2010/0238612 | A1 | 9/2010 | Hsiao et al. |
| 2010/0294556 | A1 | 11/2010 | Chuo et al. |
| 2011/0148797 | A1 | 6/2011 | Huitema et al. |
| 2011/0205695 | A1 | 8/2011 | Hassemer et al. |
| 2012/0002360 | A1 | 1/2012 | Seo et al. |
| 2012/0014054 | A1* | 1/2012 | Ashcraft et al. ......... 361/679.26 |
| 2012/0044620 | A1 | 2/2012 | Song et al. |
| 2012/0162866 | A1 | 6/2012 | Bohn |
| 2012/0194972 | A1 | 8/2012 | Bohn |
| 2012/0257368 | A1 | 10/2012 | Bohn et al. |
| 2012/0262367 | A1 | 10/2012 | Chiu et al. |
| 2012/0307472 | A1* | 12/2012 | Bohn et al. ..................... 361/807 |
| 2012/0314399 | A1* | 12/2012 | Bohn et al. ................... 362/97.1 |
| 2012/0314400 | A1* | 12/2012 | Bohn et al. ................... 362/97.1 |

OTHER PUBLICATIONS

"PCT Search Report and Written Opinion", Application No. PCT/US2012/041185, (Jan. 7, 2013), 9 pages.

"Nokia 888 Mobile Phone by Tamer Nakisci", Retrieved at <<http://www.yankodesign.com/2005/09/30/nokia-888-mobile-phone-by-tamer-nakisci/>>, Retrieved Date: Mar. 24, 2011, pp. 22.

Schwartz, Ariel, "Kyocera Unveils Kinetic Flexible OLED Cell Phone", Retrieved at <<http://inhabitat.com/kyocera-unveils-kinetic-flexible-oled-cell-phone/>>, Apr. 16, 2009, pp. 18.

G. Maria, "Samsung Bendable Display—Screen as Flexible As Paper", Retrieved at <<http://readatech.com/2011/01/07/samsung-bendable-display-screen-as-flexible-as-paper-1435/>>, Jan. 7, 2011, pp. 3.

"Cell Phone FPCs", Retrieved from: <http://www.hiwtc.com/products/cellphone-fpcs-33754121-12743.htm> on Feb. 21, 2011, 2 pages.

"Laptop/notebook lcd screen hinge", Retrieved from: <http://www.alibaba.com/product-gs/245202461/laptop_notebook_lcd_screen_hinge.html> on Feb. 23, 2011, 2 pages.

"Sleek designs hinge on strong rotary joints", Retrieved from : <http://machinedesign.com/article/sleek-designs-hinge-on-strong-rotary-joints-1104> on Feb. 21, 2011, (Nov. 4, 2004),4 pages.

"Final Office Action", U.S. Appl. No. 13/153,092, (Jul. 12, 2013), 19 pages.

"Non-Final Office Action", U.S. Appl. No. 13/153,092, (Sep. 30, 2013), 25 pages.

"Non-Final Office Action", U.S. Appl. No. 13/154,786, (Jul. 12, 2013), 20 pages.

"International Search Report", Mailed Date: Nov. 29, 2012, Application No. PCT/US2012/040617, Filed Date: Jun. 2, 2012, pp. 9

"Final Office Action", U.S. Appl. No. 13/154,786, Dec. 27, 2013, 19 pages.

"Final Office Action", U.S. Appl. No. 13/154,786, Nov. 4, 2014, 19 pages.

"Notice of Allowance", U.S. Appl. No. 13/153,092, Mar. 27, 2014, 11 pages.

"Non-Final Office Action", U.S. Appl. No. 13/154,786, May 19, 2014, 17 pages.

"Supplementary European Search Report", EP Application No. 12797117.4, Feb. 9, 2015, 3 pages.

"Foreign Office Action", EP Application No. 12793562.5, Mar. 4, 2015, 6 pages.

"Foreign Office Action", EP Application No. 12797117.4, Feb. 23, 2015, 6 pages.

"Non-Final Office Action", U.S. Appl. No. 13/154,786, Feb. 26, 2015, 19 Pages.

"Supplementary European Search Report", EP Application No. 12793562.5, Feb. 5, 2015, 3 pages.

"Final Office Action", U.S. Appl. No. 13/154,786, Jul. 1, 2015, 22 pages.

\* cited by examiner

FLEXIBLE DISPLAY FLEXURE ASSEMBLY

BACKGROUND

Portable electronic devices, such as mobile phones, media players, and tablet computers are increasingly common. These types of devices typically include an integrated display device, and many include dual displays. For example, a mobile device can be hinged to open two display devices side-by-side to form one larger display. Users typically want the smallest possible devices to conveniently carry in a pocket or purse, but also want devices with larger display surfaces for easier viewing. Display manufacturers are beginning to develop flexible displays that may be used to provide a larger display surface than would be typically integrated in a smaller, portable electronic device. However, flexible displays are susceptible to damage from environmental factors and when folded, such as in a hinged mobile device that would typically integrate two display devices side-by-side to form the one larger display.

SUMMARY

This Summary introduces simplified concepts of a flexible display flexure assembly, and the concepts are further described below in the Detailed Description and/or shown in the Figures. This Summary should not be considered to describe essential features of the claimed subject matter, nor used to determine or limit the scope of the claimed subject matter.

A flexible display flexure assembly is described. In embodiments, the flexure assembly includes a structure of pivotable links that couples first and second housing parts of a foldable electronic device. The first housing part of the foldable electronic device includes a flexible display, and the first housing part is integrated with a first section of the flexible display. The second housing part of the foldable electronic device is integrated with a second section of the flexible display. The pivotable links are implemented to collapse relative to each other to form a bend radius of the flexible display and support the flexible display in a closed position of the foldable electronic device. The structure of the pivotable links is also implemented to support the flexible display in an open position of the foldable electronic device.

In other embodiments, the flexible display bends around the pivotable links when the pivotable links collapse to form the bend radius as the first and second housing parts of the foldable electronic device are closed. The structure of the pivotable links includes stops to prevent overtravel of the flexible display in an open position of the foldable electronic device. The structure of the pivotable links can be implemented as a track of individual links that are movably coupled together, or as a flexure with integrated links that are formed together in a structure material. A flexure assembly can include a detent mechanism to apply a first torque to hold the foldable electronic device in an open position at approximately one-hundred and eighty degrees (180°), and to apply a second torque to hold the foldable electronic device in the closed position at approximately zero degrees (0°).

BRIEF DESCRIPTION OF THE DRAWINGS

Embodiments of a flexible display flexure assembly are described with reference to the following Figures. The same numbers may be used throughout to reference like features and components that are shown in the Figures.

DETAILED DESCRIPTION

A flexible display flexure assembly is described, and embodiments can be implemented for use with a flexible display in an extendable and/or foldable electronic device. For example, a portable device, such as a mobile phone or tablet computer, may be implemented as an extendable and/or foldable electronic device that includes an integrated flexible display. A mobile phone with a flexible display can be used as a standard-size phone and then also extended or unfolded to increase the display viewing surface for a user to read emails, view a map, edit a document, and other tasks that are conveniently accomplished on a larger display.

While features and concepts of a flexible display flexure assembly can be implemented in any number of different devices, systems, and/or configurations, embodiments of a flexible display flexure assembly are described in the context of the following example devices, systems, and methods.

Figure 1:
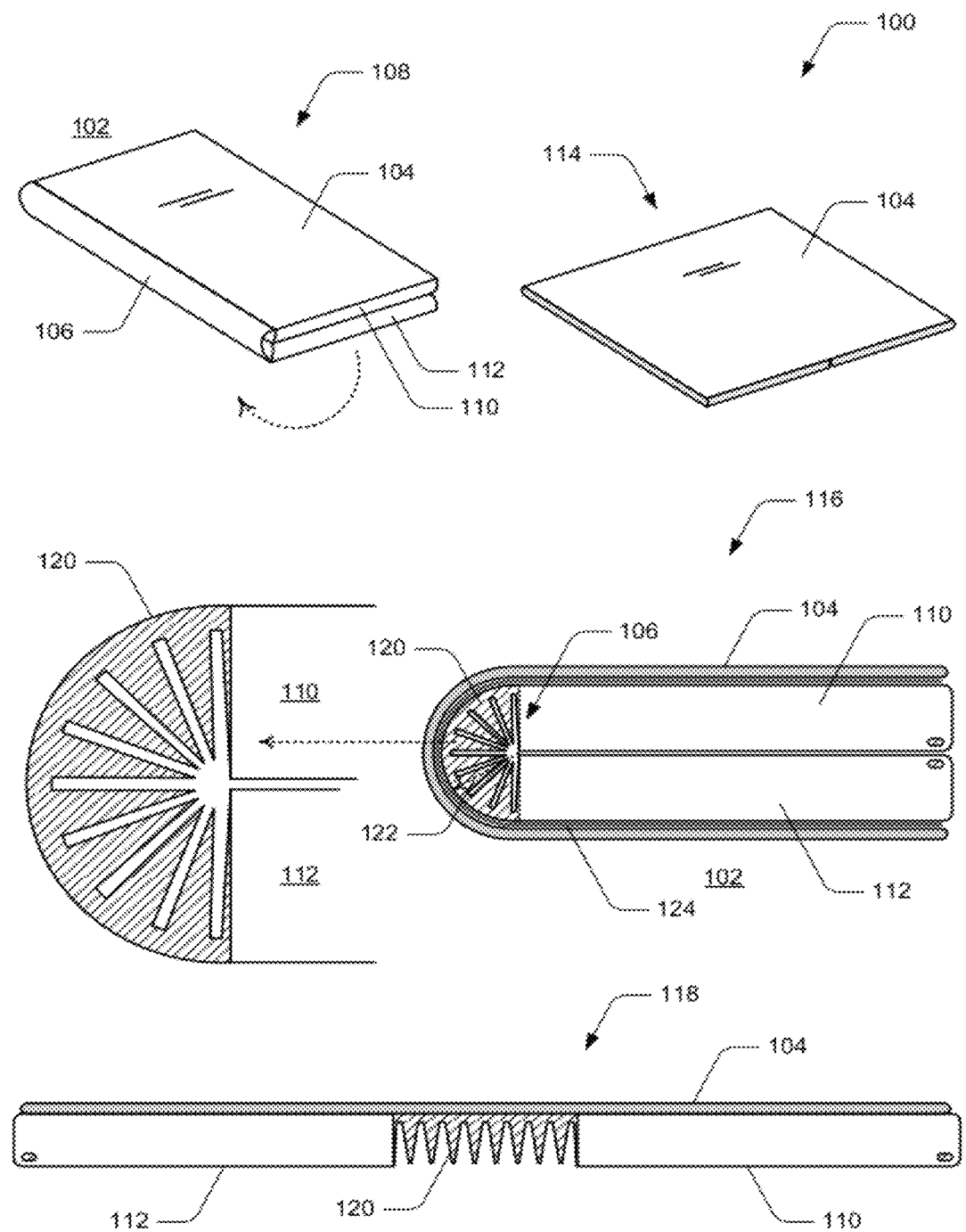
FIG. 1 illustrates an example of a flexible display flexure assembly implemented in a foldable electronic device in accordance with one or more embodiments.

FIG. 1 illustrates an example 100 of a flexible display flexure assembly in accordance with embodiments described herein. A foldable electronic device 102 includes a flexible display 104 and can be implemented with a flexure assembly 106. In a first view 108, the foldable electronic device is shown in a closed position. The device includes a first housing part 110 integrated with a first section of the flexible display, and includes a second housing part 112 integrated with a second section of the flexible display. The flexible display is viewable from opposite sides of the device in the closed position (also referred to as the anti-book mode).

The first housing part 110 is movably coupled to the second housing part 112, and operable to open from the closed position at approximately zero degrees (0°) to an open position at approximately one-hundred and eighty degrees (180°). In a second view 114, the foldable electronic device 102 is shown in the open position, such as when the second housing part 112 is rotated around and up to position the first and second housing parts adjacent each other.

In a third view 116, the foldable electronic device 102 is also shown in the closed position, and the flexible display 104 bends and folds around the flexible display flexure assembly 106 into the closed position of the device. In a fourth view 118, the foldable electronic device is also shown in the open position. The flexure assembly includes a structure of pivotable links 120, and the structure movably couples the first housing part 110 to the second housing part 112 of the foldable electronic device. The pivotable links are implemented to collapse relative to each other to form a bend radius 122 of the flexible display and support the flexible display in a closed position of the foldable electronic device. The flexible display can bend around the pivotable links 120 when they collapse to form the bend radius as the first and second housing parts of the foldable electronic device are closed. This allows the sections of the flexible display that are integrated into the first and second housing parts of the device to maintain the same relative position in the open and closed positions of the device.

The structure of the pivotable links 120 also supports the flexible display 104 in the open position of the foldable electronic device 102, as shown in the view 118. The structure of the pivotable links can include stops to prevent overtravel of the flexible display in the open position of the device. In embodiments, the pivotable links can be formed from a structure material as a flexure assembly with integrated pivotable links, such as electro-formed or machined from a polymer or metal-based material. Alternately, the pivotable links of the structure are individual links that are movably coupled together to form the structure of the pivotable links, such as a track of individual links that are movably coupled together. Examples of individual links that are movably coupled together are shown in FIG. 2.

The flexible display 104 may be implemented as a flexible LCD display that is illuminated with a backlight. A flexible backlight 124 can be implemented to illuminate the flexible display, and the flexible backlight bends under the flexible display and folds into the closed position of the foldable electronic device. Alternately, the flexible display may be implemented as a flexible OLED display that self-emits without the need for an integrated flexible backlight, as shown in the view 118.

Figure 2:
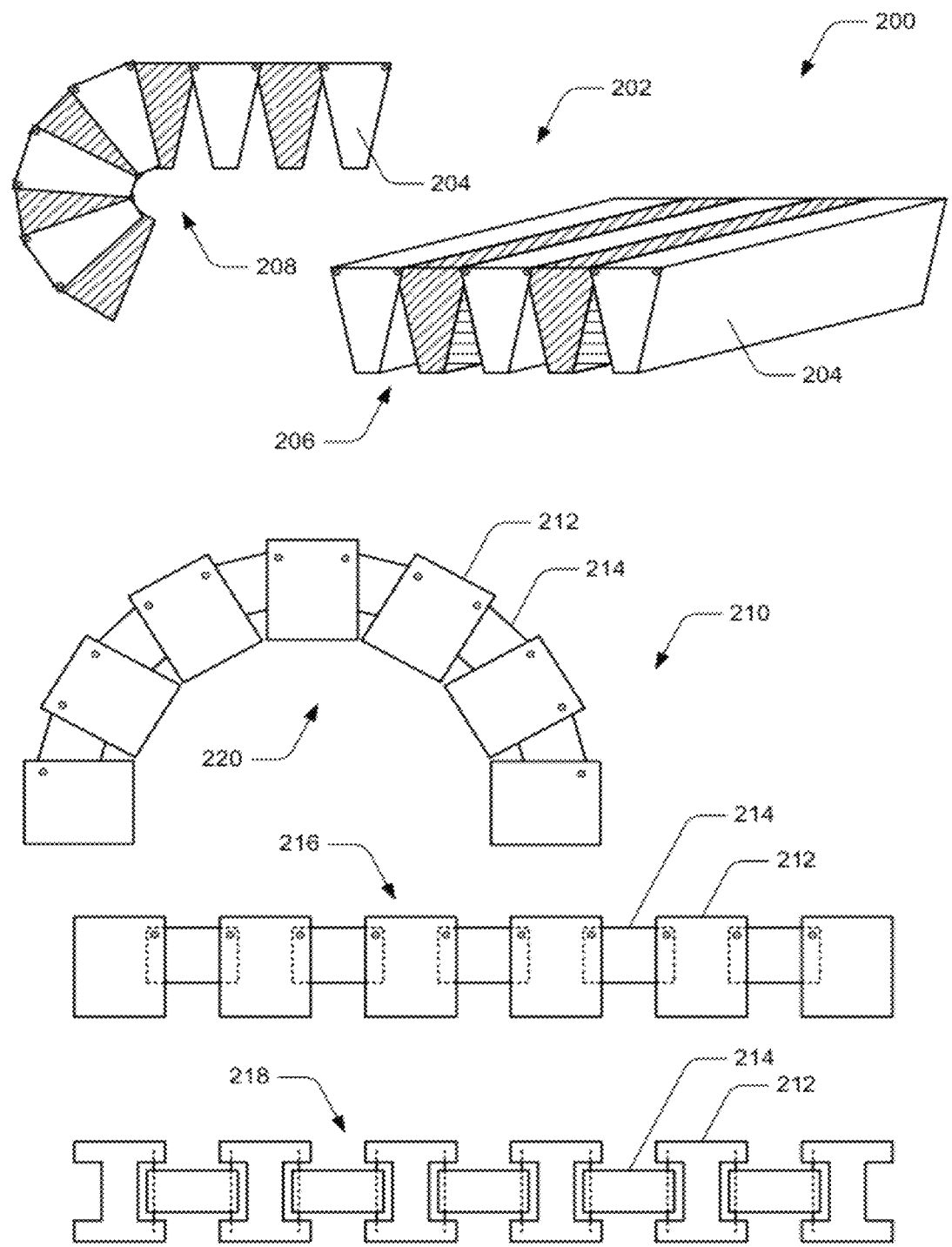
FIG. 2 further illustrates examples of a flexible display flexure assembly in accordance with one or more embodiments.

FIG. 2 further illustrates examples 200 of a flexible display flexure assembly described with reference to FIG. 1. A first structure 202 of pivotable links includes individual pivotal links 204 that are movably coupled together to form the structure of the pivotable links. The pivotable links of the first structure are shown in an open position at 206, and are also shown collapsed relative to each other at 208, such as when the first and second housing parts of a foldable electronic device are closed.

A second structure 210 of pivotable links is implemented with individual links 212 and couplers 214 that movably couple the individual links. The second structure is shown from a side view at 216 and from a top view at 218. The pivotable links of the second structure are also shown in an open position at 216, and are shown collapsed relative to each other at 220, such as when the first and second housing parts of a foldable electronic device are closed.

Figure 3:
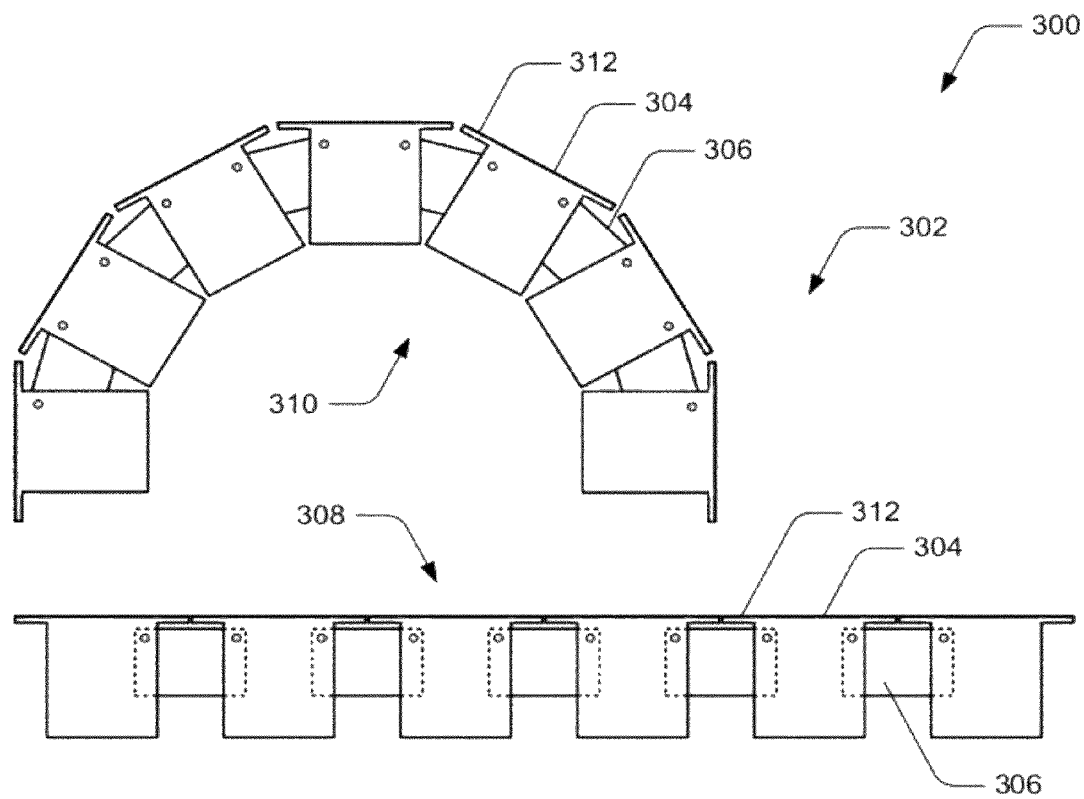
FIG. 3 further illustrates examples of flexible display flexure assemblies in accordance with one or more embodiments.
Figure 3:
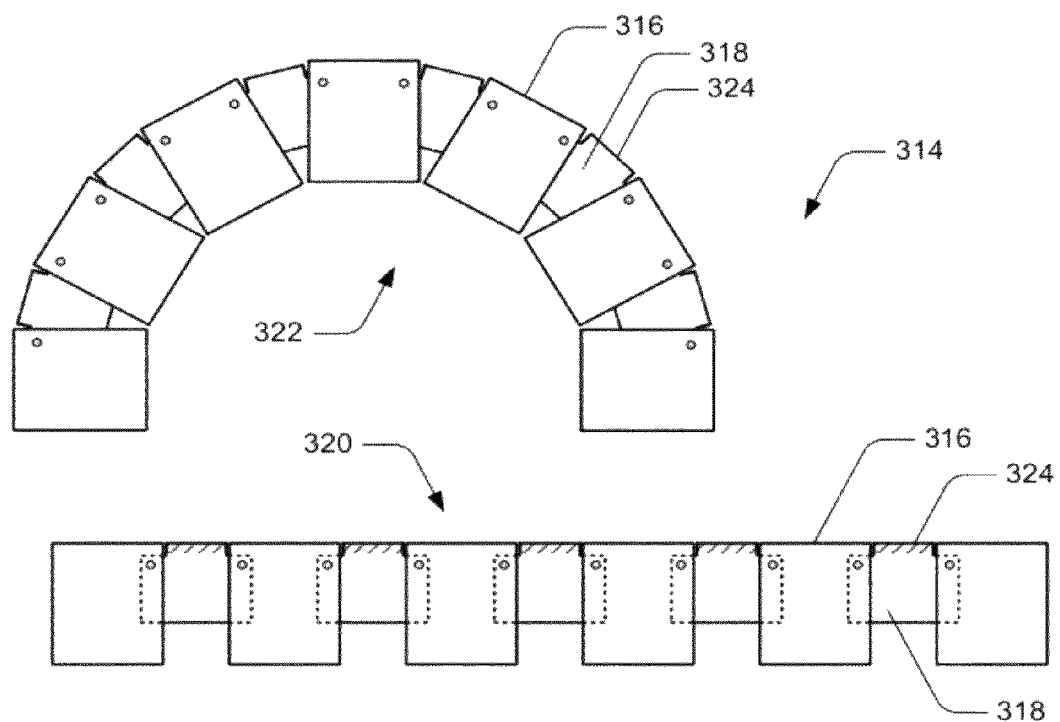

FIG. 3 further illustrates examples 300 of flexible display flexure assemblies. A first structure 302 of pivotable links is implemented with individual links 304 and couplers 306 that movably couple the individual links. The first structure is shown from a side view, and in an open position at 308 and collapsed relative to each other at 310, such as when the first and second housing parts of a foldable electronic device are closed. In this example, each of the individual links 304 include integrated stops 312 that are implemented to prevent the flexure assembly from opening beyond approximately one-hundred and eighty degrees (180°). Additionally, the stops 312 that are integrated into each of the individual links form a smooth surface to support a flexible display, such as in the open position shown at 308.

A second structure 314 of pivotable links is implemented with individual links 316 and couplers 318 that movably couple the individual links. The second structure is shown from a side view, and in an open position at 320 and collapsed relative to each other at 322, such as when the first and second housing parts of a foldable electronic device are closed. In this example, each of the couplers 318 include integrated stops 324 that are implemented to prevent the flexure assembly from opening beyond approximately one-hundred and eighty degrees (180°). Additionally, the stops 324 that are integrated into each of the couplers form a smooth surface along with the tops of the individual links to support a flexible display, such as in the open position shown at 320.

Figure 4:
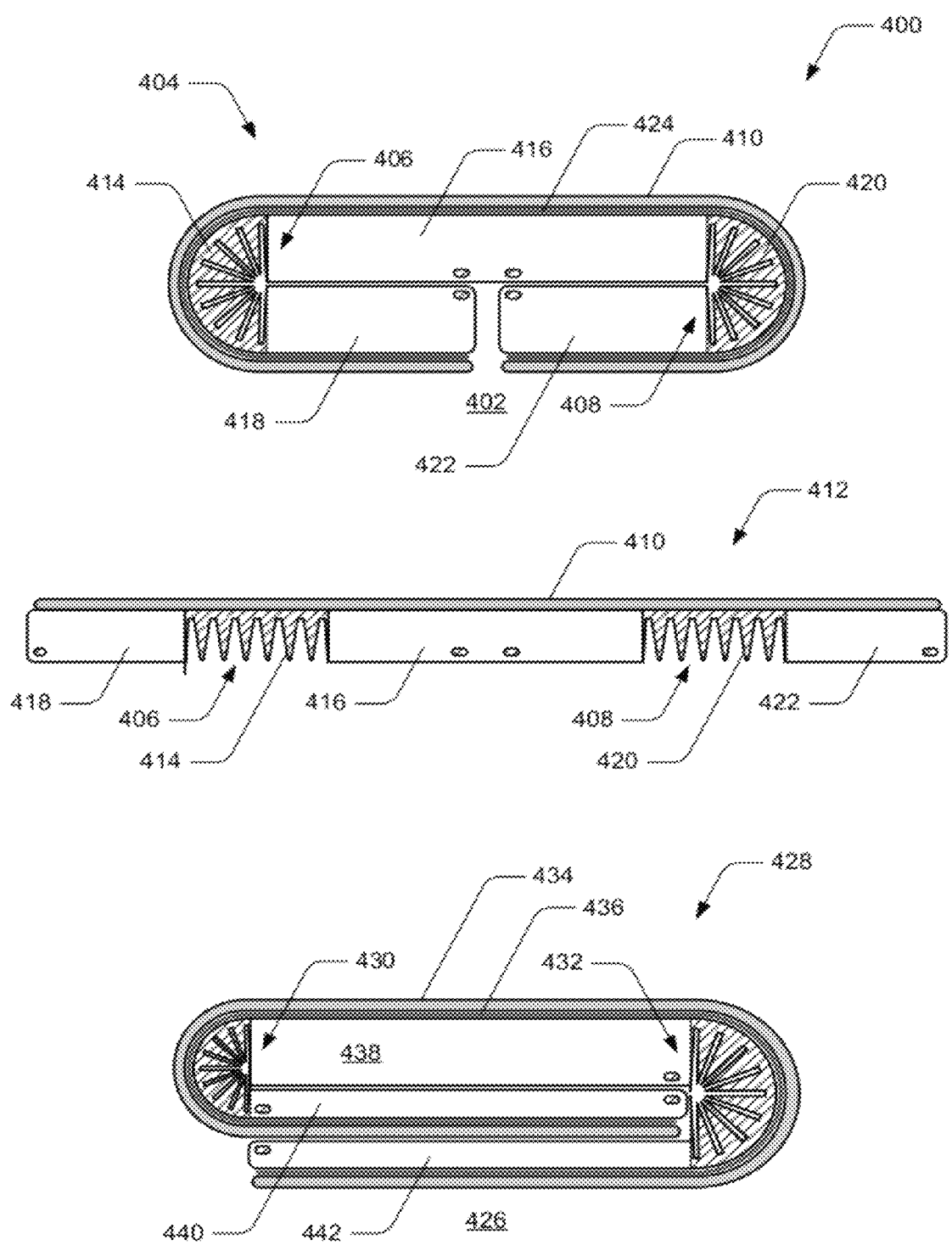
FIG. 4 illustrates an example of a flexible display flexure assembly implemented in a foldable electronic device in accordance with one or more embodiments.

FIG. 4 further illustrates examples 400 of a flexible display flexure assembly in accordance with embodiments described herein. A foldable electronic device 402 is shown in a first view 404 in a closed position. In this example, the foldable electronic device is a non-overlapping tri-fold device implemented with a first flexure assembly 406 and a second flexure assembly 408. The foldable electronic device 402 includes a flexible display 410 that bends and folds around both of the flexure assemblies into the closed position of the device. The foldable electronic device is also shown in an open position of the device in a second view 412.

The first flexure assembly 406 includes a structure of pivotable links 414, and the first structure couples a first housing part 416 of the foldable electronic device to a second housing part 418 of the device. The second flexure assembly 408 includes a structure of pivotable links 420, and the second structure couples the first housing part 416 of the foldable electronic device to a third housing part 422 of the device. The pivotable links of the two structures are implemented to collapse relative to each other to form a bend radius of the flexible display 410 and support the flexible display in the closed position of the foldable electronic device.

The first housing part 416 is integrated with a first section of the flexible display, the second housing part 418 is integrated with a second section of the flexible display, and the third housing part 422 is integrated with a third section of the flexible display. The flexible display 410 can bend around the pivotable links 414 when they collapse as the first and second housing parts of the foldable electronic device are closed. Similarly, the flexible display can bend around the pivotable links 420 when they collapse as the first and third housing parts of the foldable electronic device are closed. The first flexure assembly 406 and the second flexure assembly 408 also support the flexible display in the open position of the foldable electronic device 102, as shown in the view 412.

The flexible display 410 may be implemented as a flexible LCD display that is illuminated with a backlight. A flexible backlight 424 can be implemented to illuminate the flexible display, and the flexible backlight bends under the flexible display and folds into the closed position of the foldable electronic device. Alternately, the flexible display may be implemented as a flexible OLED display that self-emits without the need for an integrated flexible backlight, as shown in the view 412.

Another foldable electronic device 426 is shown in a closed position at 428. In this example, the foldable electronic device is an overlapping tri-fold device implemented with a smaller flexure assembly 430 relative to a larger flexure assembly 432. The foldable electronic device 426 includes a flexible display 434 and a flexible backlight 436 that bends and folds around both of the flexure assemblies into the closed position of the device. The smaller flexure assembly couples a first housing part 438 of the foldable electronic device to a second housing part 440 of the device, and pivotable links of the flexure assembly collapse relative to each other to form a bend radius and support the flexible display in the closed position of the device. Similarly, the larger flexure assembly couples the first housing part of the foldable electronic device to a third housing part 442 of the device, and pivotable links of the flexure assembly collapse relative to each other to form a bend radius and support the flexible display in the closed position of the device. In this example, the housing parts of the foldable electronic device are approximately a same width, while a thickness of the housing parts may vary.

Figure 5:
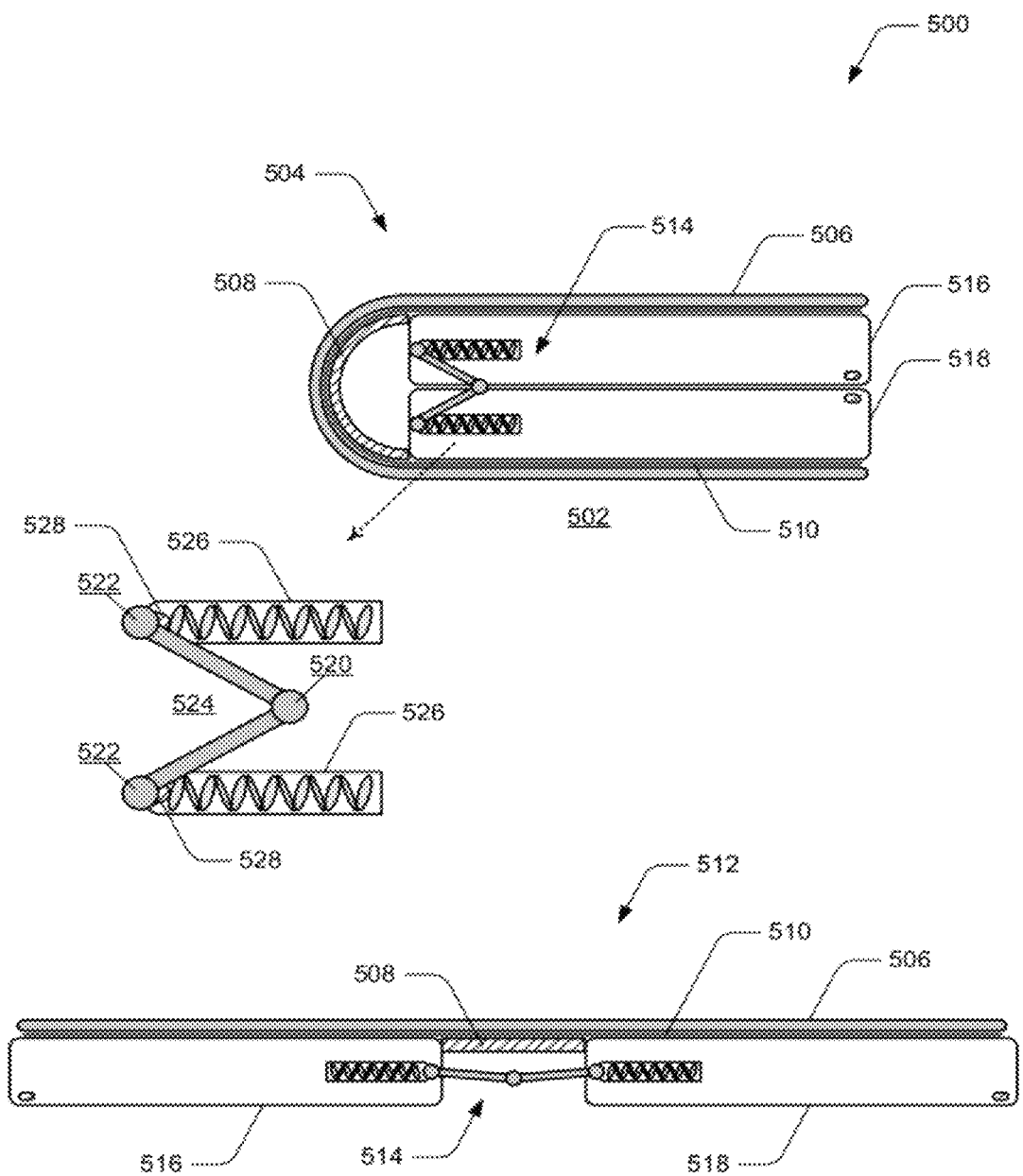
FIG. 5 illustrates an example of a flexible display flexure assembly implemented in a foldable electronic device in accordance with one or more embodiments.

FIG. 5 illustrates an example 500 of a flexible display flexure assembly in accordance with embodiments described herein. A foldable electronic device 502 is shown in a first view 504 in a closed position. The foldable electronic device includes a flexible display 506 that bends and folds around a display support 508 into the closed position of the device. In embodiments, the display support 508 may be implemented as a flexible support and/or as any of the flexure assemblies that include individual and/or integrated pivotable links as described with reference to FIGS. 1-3. The flexible display 506 may be implemented as a flexible LCD display that is illuminated with a backlight. A flexible backlight 510 can be implemented to illuminate the flexible display, and the flexible backlight bends under the flexible display and folds into the closed position of the foldable electronic device. Alternately, the flexible display may be implemented as a flexible OLED display that self-emits without the need for an integrated flexible backlight. The foldable electronic device is also shown in an open position of the device in a second view 512.

The foldable electronic device 502 includes a flexure assembly 514 that movably couples a first housing part 516 of the foldable electronic device to a second housing part 518 of the device. The flexure assembly 514 includes pivot mechanisms 520 and 522, two connecting rods 524 that are coupled by the pivot mechanisms, and cam assemblies 526 that apply a torque to open and close the foldable electronic device. The pivot mechanisms 522 can each include an integrated cam 528 that rotates relative to the respective cam assemblies 526 to apply detent forces when the device is opened and closed. In embodiments, the pivot assembly can be implemented as a pin, an axial cam, and/or a geared cam, such as to control an opening and closing timing of the first and second housing parts of the foldable electronic device. The flexure assembly can also be implemented with overtravel stops to prevent the foldable electronic device from opening too far (e.g., beyond approximately 180° or less).

Figure 6:
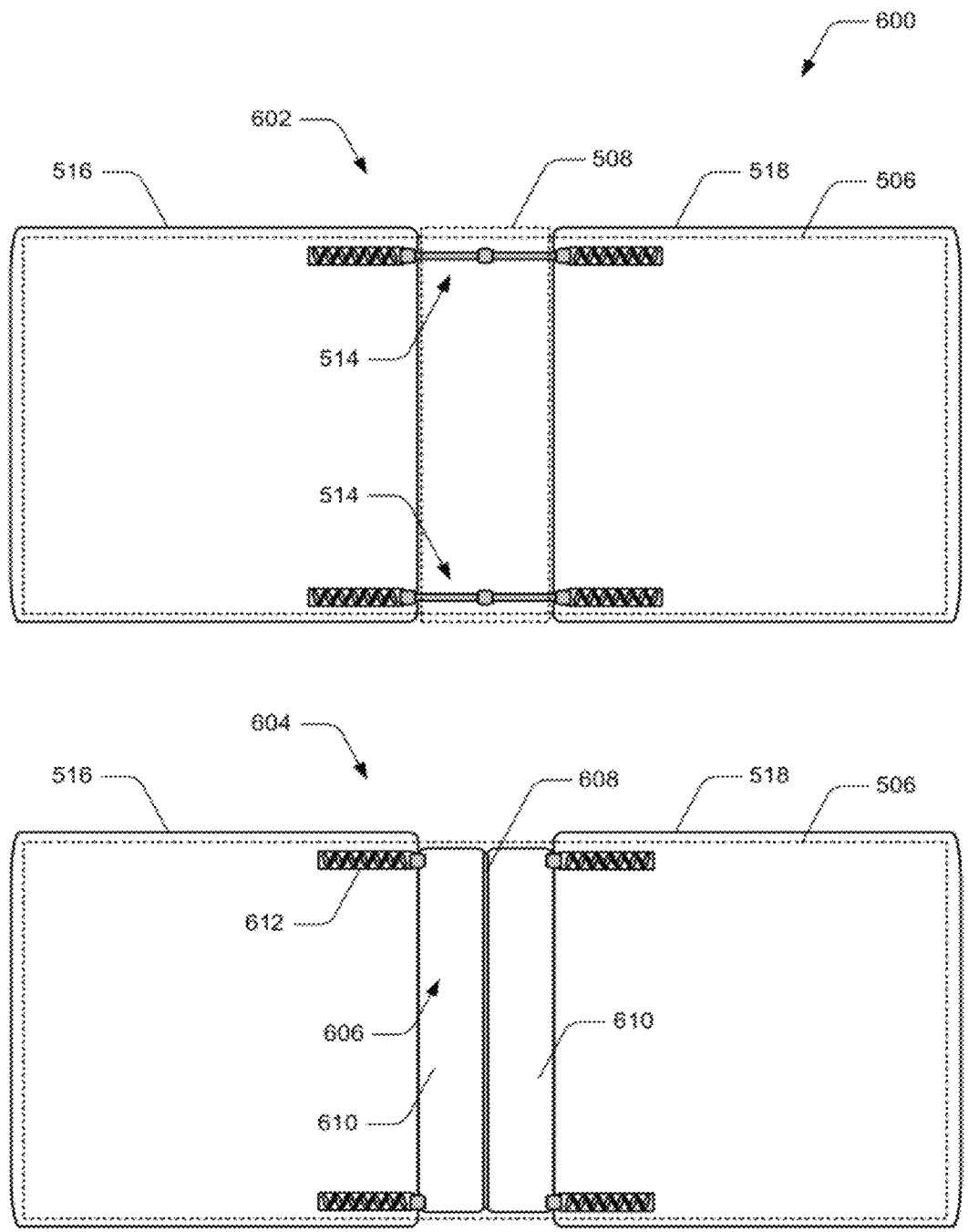
FIG. 6 further illustrates the foldable electronic device shown in FIG. 5 with example configurations of flexure assemblies in accordance with one or more embodiments.

FIG. 6 further illustrates the foldable electronic device 502 shown and described with reference to FIG. 5. The foldable electronic device is shown from a top view at 602 in a first configuration that includes two of the flexure assemblies 514 that movably couple the first housing part 516 of the foldable electronic device to the second housing part 518 of the device. In other embodiments, the foldable electronic device may be implemented with more than two of the flexure assemblies, such as with an additional flexure assembly positioned approximately center between the two flexure assemblies 514. The foldable electronic device is also shown from a top view at 604 in a second configuration that includes a flexure assembly 606 implemented as a solid assembly across the bottom of the device. The flexure assembly 606 includes a pivot mechanism 608, two connecting plates 610, and the cam assemblies 612.

Figure 7:
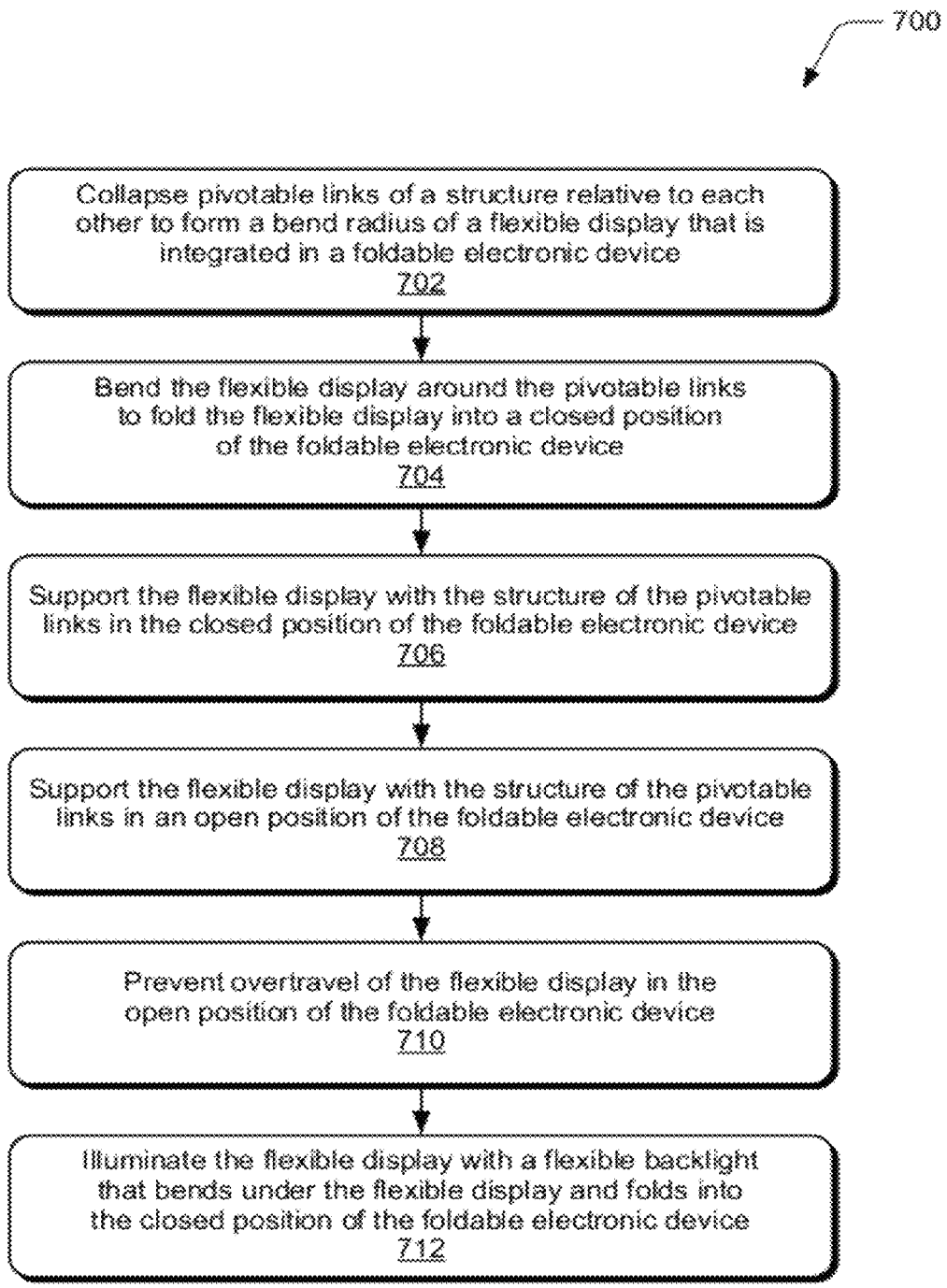
FIG. 7 illustrates example method(s) of a flexible display flexure assembly in accordance with one or more embodiments.

FIG. 7 illustrates example method(s) 700 of a flexible display flexure assembly. The order in which the method blocks are described are not intended to be construed as a limitation, and any number of the described method blocks can be combined in any order to implement a method, or an alternate method.

At block 702, pivotable links of a structure collapse relative to each other to form a bend radius of a flexible display that is integrated in a foldable electronic device. For example, the flexure assembly 106 (FIG. 1) includes the pivotable links 120 of the structure that collapse relative to each other to form the bend radius 122 of the flexible display 104 that is integrated in the foldable electronic device 102.

At block 704, the flexible display bends around the pivotable links to fold the flexible display into a closed position of the foldable electronic device. For example, the flexible display 104 bends around the pivotable links 120 when they collapse to form the bend radius 122 as the first and second housing parts of the foldable electronic device 102 are closed.

At block 706, the flexible display is supported with the structure of the pivotable links in the closed position of the foldable electronic device. For example, the structure of the pivotable links 120 supports the flexible display 104 in the closed position of the foldable electronic device 102, as shown in the view 116. At block 708, the flexible display is supported with the structure of the pivotable links in an open position of the foldable electronic device. For example, the structure of the pivotable links 120 supports the flexible display 104 in the open position of the foldable electronic device 102, as shown in the view 118.

At block 710, overtravel of the flexible display is prevented in the open position of the foldable electronic device. For example, the structure of the pivotable links 120 includes stops to prevent overtravel of the flexible display 104 in the open position of the foldable electronic device 102. At block 712, the flexible display is illuminated with a flexible backlight that bends under the flexible display and folds into the closed position of the foldable electronic device. For example, the flexible backlight 124 illuminates the flexible display 104, such as a flexible LCD display, and the flexible backlight bends under the flexible display and folds into the closed position of the foldable electronic device.

Figure 8:
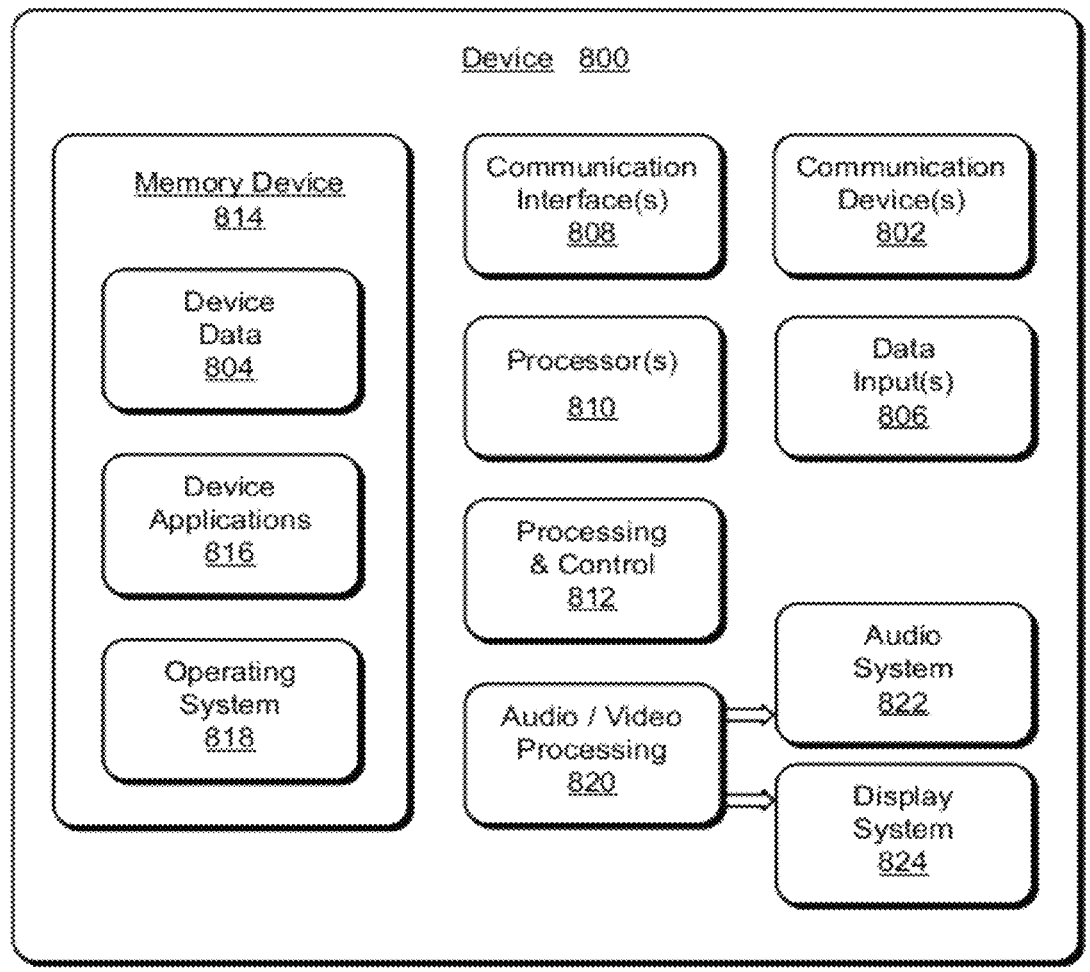
FIG. 8 illustrates various components of an example electronic device in which embodiments of a flexible display flexure assembly can be implemented.

FIG. 8 illustrates various components of an example device 800 that can be implemented as any of the foldable electronic devices described with reference to the previous FIGS. 1-7. In embodiments, the device may be implemented as any one or combination of a fixed or mobile device, in any form of a consumer, computer, portable, user, communication, phone, navigation, television, appliance, gaming, media playback, and/or electronic device. The device may also be associated with a user (i.e., a person) and/or an entity that operates the device such that a device describes logical devices that include users, software, firmware, hardware, and/or a combination of devices.

The device 800 includes communication devices 802 that enable wired and/or wireless communication of device data 804, such as received data, data that is being received, data scheduled for broadcast, data packets of the data, etc. The device data or other device content can include configuration settings of the device, media content stored on the device, and/or information associated with a user of the device. Media content stored on the device can include any type of audio, video, and/or image data. The device includes one or more data inputs 806 via which any type of data, media content, and/or inputs can be received, such as user-selectable inputs and any other type of audio, video, and/or image data received from any content and/or data source.

The device 800 also includes communication interfaces 808, such as any one or more of a serial, parallel, network, or wireless interface. The communication interfaces provide a connection and/or communication links between the device and a communication network by which other electronic, computing, and communication devices communicate data with the device.

The device 800 includes one or more processors 810 (e.g., any of microprocessors, controllers, and the like) which process various computer-executable instructions to control the operation of the device. Alternatively or in addition, the device can be implemented with any one or combination of software, hardware, firmware, or fixed logic circuitry that is implemented in connection with processing and control circuits which are generally identified at 812. Although not shown, the device can include a system bus or data transfer system that couples the various components within the device. A system bus can include any one or combination of different bus structures, such as a memory bus or memory controller, a peripheral bus, a universal serial bus, and/or a processor or local bus that utilizes any of a variety of bus architectures.

The device 800 also includes one or more memory devices 814 (e.g., computer-readable storage media) that enable data storage, such as random access memory (RAM), non-volatile memory (e.g., read-only memory (ROM), flash memory, etc.), and a disk storage device. A disk storage device may be implemented as any type of magnetic or optical storage device, such as a hard disk drive, a recordable and/or rewriteable disc, and the like. The device may also include a mass storage media device.

Computer readable media can be any available medium or media that is accessed by a computing device. By way of example, and not limitation, computer readable media may comprise storage media and communication media. Storage media include volatile and non-volatile, removable and non-removable media implemented in any method or technology for storage of information, such as computer-readable instructions, data structures, program modules, or other data. Storage media include, but are not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store information and which can be accessed by a computer.

Communication media typically embody computer-readable instructions, data structures, program modules, or other data in a modulated data signal, such as carrier wave or other transport mechanism. Communication media also include any information delivery media. A modulated data signal has one or more of its characteristics set or changed in such a manner as to encode information in the signal. By way of example, and not limitation, communication media include wired media such as a wired network or direct-wired connection, and wireless media such as acoustic, RF, infrared, and other wireless media.

A memory device 814 provides data storage mechanisms to store the device data 804, other types of information and/or data, and various device applications 816. For example, an operating system 818 can be maintained as a software application with the memory device and executed on the processors. The device applications may also include a device manager, such as any form of a control application, software application, signal processing and control module, code that is native to a particular device, a hardware abstraction layer for a particular device, and so on.

The device 800 also includes an audio and/or video processing system 820 that generates audio data for an audio system 822 and/or generates display data for a display system 824, such as an integrated flexible display. The audio system and/or the display system may include any devices that process, display, and/or otherwise render audio, video, display, and/or image data. Display data and audio signals can be communicated to an audio device and/or to a display device via an RF (radio frequency) link, S-video link, composite video link, component video link, DVI (digital video interface), analog audio connection, or other similar communication link. In implementations, the audio system and/or the display system are integrated components of the example device. Alternatively, the audio system and/or the display system are external components to the device.

Although embodiments of a flexible display flexure assembly have been described in language specific to features and/or methods, the subject of the appended claims is not necessarily limited to the specific features or methods described. Rather, the specific features and methods are disclosed as example implementations of a flexible display flexure assembly.

The invention claimed is:

1. A flexure assembly, comprising:
a first housing part of a foldable electronic device that includes a flexible display, the first housing part integrated with a first section of the flexible display;
a second housing part of the foldable electronic device, the second housing part integrated with a second section of the flexible display; and
a structure of one or more pivotable links that couples the first and second housing parts of the foldable electronic device along a first axis, the pivotable links having an outer surface, the pivotable links bendably movable between a curved position corresponding to a closed position and a generally linear position corresponding to an open position, the pivotable links contained between the flexible display and the first and second housing parts when the pivotable links are in the curved position, each pivotable link having a cross-section generally perpendicular to the first axis with a length extending along a long axis generally perpendicular to the flexible display and a width extending along a short axis generally parallel to the flexible display, the width being shorter than the length;
a middle section of the flexible display extending over the outer surface of the pivotable links.

2. A flexure assembly as recited in claim 1, wherein the structure of the pivotable links includes stops to prevent overtravel of the flexible display in the open position of the foldable electronic device.

3. A flexure assembly as recited in claim 1, wherein the pivotable links are integrated in a structure material to form the structure of the pivotable links.

4. A flexure assembly as recited in claim 1, wherein the pivotable links of the structure are individual links that are movably coupled together to form the structure of the pivotable links.

5. A flexure assembly as recited in claim 1, wherein the structure of the pivotable links comprises one of a flexure with integrated links or a track of individual links that are movably coupled together.

6. A flexure assembly as recited in claim 1, wherein at least a portion of the outer surface of the pivotable links faces away from the first and second housing parts when in the closed position.

7. A flexure assembly as recited in claim 6, wherein the first section of the flexible display, the second section of the flexible display, and the middle section of the flexible display face outward when in the closed position.

8. A flexure assembly as recited in claim 7, wherein the first section of the flexible display, the second section of the flexible display, and the middle section of the flexible display face in a same direction when in the open position.

9. A flexure assembly as recited in claim 1, wherein each pivotable link has a cross-section perpendicular to the first axis which is generally triangular in shape, the structure of pivotable links forming trenches between pivotable links, each trench having a cross-section perpendicular to the first axis which is generally triangular in shape and oriented inverse to the generally triangular cross-sections of the pivotable links.

10. A foldable electronic device, comprising:
a flexible display having an outwardly-facing display surface, the flexible display being configured to fold into a closed position of the foldable electronic device in which portions of the outwardly-facing display surface face away from one another;
a first housing part integrated with a first section of the flexible display;
a second housing part integrated with a second section of the flexible display; and
a structure of pivotable links that couples the first and second housing parts of the foldable electronic device along a first axis, the pivotable links bendably movable between a curved position corresponding to the closed position and a generally linear position corresponding to an open position, the pivotable links contained between the flexible display and the first and second housing parts when the pivotable links are in the curved position, each pivotable link having a cross-section generally perpendicular to the first axis with a length extending along a long axis generally perpendicular to the display surface and a width extending along a short axis generally parallel to the display surface, the width being shorter than the length.

11. A foldable electronic device as recited in claim 10, wherein the structure of the pivotable links includes stops to prevent overtravel of the flexible display in the open position of the foldable electronic device.

12. A foldable electronic device as recited in claim 10, wherein the pivotable links are integrated in a structure material to form the structure of the pivotable links.

13. A foldable electronic device as recited in claim 10, wherein the pivotable links of the structure are individual links that are movably coupled together to form the structure of the pivotable links.

14. A method, comprising:
providing collapsible pivotable links of a structure that are collapsible relative to each other to form a bend radius of a flexible display that has a viewable display surface, the structure of the pivotable links coupling first and second housing parts of a foldable electronic device along a first axis, each pivotable link having a cross-section generally perpendicular to the first axis with a length extending along a long axis generally perpendicular to the display surface and a width extending along a short axis generally parallel to the display surface, the width being tapered so as to be widest at a point closest to the display surface and narrowest at a point furthest from the display surface;
the foldable electronic device being configured to permit:
bending the flexible display around the pivotable links to fold the flexible display into a closed position of the foldable electronic device when the first and second housing parts are closed relative to each other, the viewable display surface being viewable from opposite sides of the foldable electronic device when in the closed position;
supporting the flexible display with the structure of the pivotable links in the closed position of the foldable electronic device; and
supporting the flexible display with the structure of the pivotable links in an open position of the foldable electronic device.

15. A method as recited in claim 14, the foldable electronic device further configured to permit preventing overtravel of the flexible display in the open position of the foldable electronic device.

16. A method as recited in claim 14, wherein the structure of the pivotable links comprises one of a flexure with integrated links or a track of individual links that are movably coupled together.

17. A method as recited in claim 14, the foldable electronic device further configured to permit illuminating the flexible display with a flexible backlight that bends under the flexible display and folds into the closed position of the foldable electronic device.

18. A method as recited in claim 14, further comprising each pivotable link having a cross-section perpendicular to the first axis which is generally quadrilateral in shape.

19. A method as recited in claim 14, further comprising each pivotable link having a cross-section perpendicular to the first axis which is generally triangular in shape.

20. A method as recited in claim 19, further comprising the structure of pivotable links forming trenches between pivotable links, each trench having a cross-section perpendicular to the first axis which is generally triangular in shape and oriented inverse to the generally triangular cross-sections of the pivotable links.

* * * * *